UNITED STATES PATENT OFFICE.

SAMUEL H. REEVES, OF ALAMOSA, COLORADO, ASSIGNOR OF ONE-HALF TO CHARLES R. BOLLIER, OF ALAMOSA, COLORADO.

PROCESS OF TREATING PRESERVATIVES.

1,302,090.          Specification of Letters Patent.     Patented Apr. 29, 1919.

No Drawing.     Application filed November 24, 1917. Serial No. 203,778.

*To all whom it may concern:*

Be it known that I, SAMUEL H. REEVES, a citizen of the United States, residing at Alamosa, in the county of Alamosa and State of Colorado, have invented certain new and useful Improvements in Processes of Treating Preservatives, of which the following is a specification.

This invention relates to an improved process for treating preservatives such as are used upon metal, wood, leather, rubber or cloth surfaces to prevent rusting or rotting of the materials.

In its more specific aspect, the present invention provides an improved process for the treatment of elaterite, asphaltum, and analogous bituminous minerals whereby the same are rendered impervious to moisture, and to which a finishing coat of paint may be applied, and the possibility of the paint cracking or peeling off from the surface of the preservative material, obviated.

And it is the general object of the invention to provide an improved process as above characterized which is exceedingly simple, may be inexpensively practised and is highly efficient for the purpose in view.

With the above and other objects in view the invention consists in the several steps or operations which I will now relate in detail.

Elaterite, asphaltum, and bituminous minerals of the same group are well known for their preservative properties. The process as herein embodied has been principally used in the treatment of elaterite. This mineral, sometimes called elastic bitumen, when taken from the mines is put into a boiler and heated with steam and oil, so that it is softened or reduced to a plastic condition, after which it is removed from the boiler and permitted to cool. In carrying out my process, I place a quantity of plastic elaterite in an open pan or oven and add thereto coal oil amounting to 1% of the mineral. This coal oil is then ignited, and substantially all substances contained in the mineral are burned out and the elaterite is thereby again reduced to its pure state.

Ssecondly I now add gasolene amounting to 20% of the elaterite and thoroughly mix the gasolene and the mineral so that it can then be applied to the surface with a paint brush.

When the elaterite, or other bituminous mineral is applied to wood, iron, leather, rubber, cloth, tin or other material which it is desired to preserve, the gasolene will quickly evaporate so that a pure coating of the mineral which is pliable and impervious to moisture will adhere to the surface to which it is applied. This preservative coat of elaterite may now be painted over. I have found that usually the preservative material will thoroughly dry in about thirty minutes so that the paint can be applied. As the bituminous mineral contains no non-drying substance, the paint will not crack or peel off of the surface. This is the primary advantage to be obtained by means of the improved process. Heretofore manufacturers have found it impossible to prevent the peeling or cracking of the paint, and for this reason when such preservative materials are used, it is necessary to repaint the surface thereof quite frequently. It will thus be appreciated that the present invention obviates the necessity of this repainting and thereby reduces the expense incident to the use of such preservative, as well as eliminating the manual labor incident to the frequent repainting thereof.

I have above referred with some particularity to the quantity of coal oil and gasolene which is used in carrying out the process, and which I have found to give excellent results. It is however manifest that the invention is not to be limited to such definite proportions, but the privilege is reserved of resorting to such variations therein as might be deemed desirable.

I claim:

The herein described process of treating a plastic bituminous preservative material to render the same impervious to moisture which consists in first adding an inflammable liquid thereto and igniting the same, said inflammable liquid being in quantity substantially one per cent. of the material, and then adding a readily evaporable liquid to the material to reduce the consistency thereof, said last named liquid being in quantity substantially twenty per cent. of the material.

In testimony whereof I hereunto affix my signature in the presence of two witnesses.

SAMUEL H. REEVES.

Witnesses:
    E. C. CONRATH,
    E. N. HARRIS.